March 15, 1966 C. L. ISBORN 3,240,955

BISTABLE ELECTRONIC CIRCUIT HAVING OSCILLATORY AND NON-OSCILLATORY STABLE STATES

Filed Oct. 5, 1959 3 Sheets-Sheet 1

INVENTOR.
CARL L. ISBORN

BY

Lippincott & Ralls
ATTORNEYS

INVENTOR.
CARL L. ISBORN
BY
Lippincott & Ralls
ATTORNEYS

March 15, 1966 C. L. ISBORN 3,240,955

BISTABLE ELECTRONIC CIRCUIT HAVING OSCILLATORY AND NON-OSCILLATORY STABLE STATES

Filed Oct. 5, 1959 3 Sheets-Sheet 3

INVENTOR.
CARL L. ISBORN
BY
Lippincott & Ralls
ATTORNEYS 3,240,955
BISTABLE ELECTRONIC CIRCUIT HAVING OSCILLATORY AND NON-OSCILLATORY STABLE STATES

Carl L. Isborn, Richmond, Calif., assignor to Beckman Instruments, Inc., Fullerton, Calif., a corporation of California Filed Oct. 5, 1959, Ser. No. 844,390
8 Claims. (Cl. 307—88.5)

The present invention relates to an electronic circuit having a pair of stable operating states which may be characterised as oscillatory and non-oscillatory.

Bistable electronic circuits having two stable operating conditions are well-known in the art, and certain types thereof are commonly termed flip-flop circuits or, in the field of counting equipment, binaries. Circuits of this type are widely applicable, as for example, in the fields of control circuitry, counting circuits, and computing devices. Bistable circuits are often compounded or cascaded in relatively large numbers to produce particularly desired results, and thus it is important and advantgeous for bistable circuits to be readily joined together, to have a minimum cost and complexity, and to be highly reliable. The utilization of transistors in bistable circuits is particularly desirable in the accomplishment of the above-noted and other requirements of these types of circuits; however, difficulty is often encountered in the utilization of transistors in this respect for the output thereof is generally relatively low level, so that suitable driving power is difficult to obtain therefrom. This is particularly true in various counting and computing applications, for indicators or registers normally associated with such apparatus commonly require more driving power than is available from transistorized circuits of this type.

It is also highly desirable in many applications of bistable circuits to provide for a minimization of the standby power employed in operating the circuit. More specifically, the establishment of one of two stable operating conditions wherein a minimum power consumption obtains is highly desirable for those applications wherein a latching operation is contemplated, and substantial periods of circuit operation in the low power state thereof is envisioned. Conversely, a large power output is highly desirable in the opposite circuit state, so as to eliminate the need for additional amplification associated therewith. This latter condition is preferably accompanied by a high power gain in the bistable circuit.

The present invention fulfills the above-noted requirements of bistable circuits as well as others not herein mentioned. The circuit hereof is materially simplified over many bistable circuits by the utilization of a single active element rather than a pair of such elements, as is conventional. By the utilization of a single active element it is possible herewith to minimize the expense of the circuit and to maximize the reliability thereof. The bistable circuit of the present invention provides not only a direct current output but also an alternating current component thereof. By the provision of such an alternating current output it is possible to employ transformer action to step up the output voltage to a suitable level for actuating indicating devices, such as neon lamps or electroluminescent lamp panels.

It is an object of the present invention to provide a bistable electronic circuit having a stable oscillatory operating state and stable non-oscillatory operating state.

It is another object of the present invention to provide a flip-flop circuit of marked simplicity and employing but a single active element.

It is a further object of the present invention to provide a bistable electronic circuit producing both an alternating current and a direct current output signal.

It is yet another object of the present invention to provide a flip-flop circuit adapted for utilization with a single transistor and providing a large power output with a substantial power gain.

It is yet another object of the present invention to provide an improved bistable electronic circuit which is relatively insensitive to variations in characteristics of the active device therein employed.

Another object of the present invention is to provide an improved latching switch circuit wherein an extremely small amount of standby power is consumed in one of the steady states thereof.

It is a still further object of the present invention to provide a simplified counting circuit formed of bistable elements having oscillatory and non-oscillatory states adapted for triggering by successive pulses of a single polarity.

Various other objects and advantages of the present invention will become apparent to those skilled in the art from the following description of particular preferred embodiments of the present invention. It is not intended to limit the present invention by the precise terms of the following description, but instead, reference is made to the appended claims for a definition of the full scope of the present invention.

The invention is illustrated as to particular preferred embodiments thereof in the accompanying drawings wherein.

The bistable electronic circuit of the present invention includes an amplifying device connected with a resonant circuit and feedback loop to thereby establish in such device a pair of stable operating states. These operating states are characterized by the presence or absence of oscillations in the amplifying device. Of particular importance as regards the applicability of the bistable electronic circuit of this invention is the ability thereof to transfer operation between the two stable states thereof by the application thereto of input pulses of like polarity. It is not herein necessary to employ control signals or pulses of opposite polarity to transfer operation of the circuit from one stable state to another. This characteristic of the present invention materially enhances the applicability thereof in various electronic circuits, as for example, in counting circuits and computer circuits.

As regards the above-noted amplifying device, various active elements may be employed in this respect; however, the following description is referenced to transistors. No limitation is intended by such showing or description, although it is to be appreciated that a wide variety of applications of the present invention may be best served by the utilization of transistors in the circuit hereof. In an initial or OFF state of the bistable circuit, there are applied to the amplifying device operating voltages of such a polarity as to maintain same non-conducting, or at least substantially non-conducting. Input connections are provided for biasing the amplifying device into the range of power gain thereof whereby switching occurs from the OFF state to the ON state. In this latter state, following the application of an input signal, oscillations are sustained in the bistable circuit even after cessation of input signals. Because of the power gain of the amplifying device in the region of operation thereof into which such device is placed by the input signal, these oscillations continue even after the biasing is removed. A memory unit in the form of a capacitor and resistor is connected to the amplifying device so that upon the receipt of a second input signal the resultant oscillations of increased amplitude will serve to vary the voltage across the amplifying device, and to in fact establish such a voltage levels thereacross that the device is placed in a conducting condition wherein insufficient amplification is provided in the absence of an input signal to sustain oscillations. Thus, upon the cessation of the second input signal, the amplifying device ceases to conduct, and the bistable circuit reverts to the original or OFF state thereof.

Figure 1:
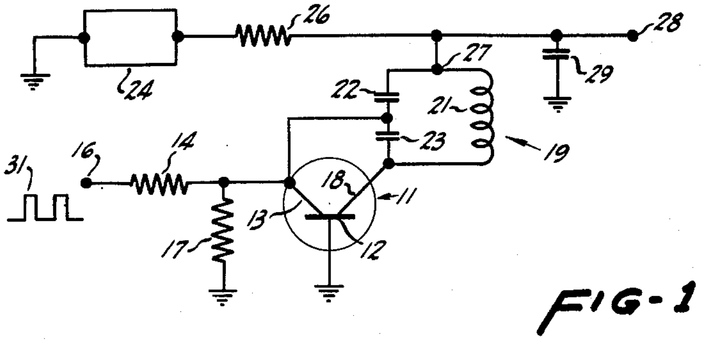
FIG. 1 is a circuit diagram of a bistable circuit in accordance with the present invention and embodying a colpitts oscillator circuit.

The present invention may be best understood by reference to specific embodiments thereof, and in this connection there is illustrated in FIG. 1 a particular preferred embodiment of the bistable electronic circuit of the present invention including oscillator connections of the Colpitts type. Referring to FIG. 1, there will be seen to be provided therein a transistor 11 having a base 12 connected to electrical ground and an emitter 13 connected through a resistor 14 to an input terminal 16. The emitter 13 is also grounded through a resistor 17, and the transistor collector 18 is connected to one side of a resonant tank circuit 19. This tank circuit includes an inductor 21 connected in parallel with a pair of series-connected capacitors 22 and 23. Connection is made from the transistor emitter 13 to the junction of the capacitors 22 and 23, and connection is made from the transistor collector 18 to the junction of the inductor 21 and capacitor 23. The transistor 11 will be seen to be connected in a common base circuit, and a potential—analogous to a plate supply—is provided by a power supply 24 having the positive terminal thereof grounded and the negative terminal thereof connected through a resistor 26 to a tank circuit terminal 27 at the junction of the inductor 21 and capacitor 22 thereof. An output terminal 28 is grounded through a capacitor 29, and is also connected to this tank circuit terminal 27.

As regards the operation of the basic bistable circuit illustrated in FIG. 1 and described above, it will be seen that the power supply 24 establishes a reverse voltage condition in the transistor 11, so that in the absence of a bias current to the emitter 13 the transistor remains non-conducting. In this non-conducting state, the capacitor 29 will be seen to become charged to the voltage of the power supply 24, so that the voltage at the output terminal 28 is substantially that of the power supply 24. Actuation of the circuit to change same from an OFF state to an ON state is accomplished by the application of a positive voltage pulse to the input terminal 16. This positive input signal, as illustrated by the pulse train 31, serves to inject a bias current into the transistor via the emitter 13 thereof, so as to establish conduction in the transistor. The transistor 11 then conducts, so that a current flows from the collector thereof to the tank circuit 19. Within this tank circuit there are produced oscillations of a resonant nature whereby current is fed back into the emitter 13 through the connection of same to the tank circuit, as above-described. The transistor 11 will be seen, in this condition, to be biased to conduct, and this conduction will be of an oscillatory nature by virtue of the resonant phenomenon produced by the tank circuit 19 employed in the feedback of signals from the collector to the emitter of the transistor. Cessation of the input signal by termination of the pulse thereof does not serve to cut off the transistor, for a sufficient portion of the output current is fed back into the emitter of the transistor to maintain conduction of same. As the transistor is operating in a region of high gain, the oscillations will continue substantially indefinitely, even though the input bias current is removed.

As regards the flip-flop operation of the present circuit, the resistor 26 and capacitor 29 herein serve to provide a filtered direct current output voltage at the terminal 28, and to further provide a time delay which supplies the necessary memory function for flip-flop operation. As above-noted, the capacitor 29 is originally charged to substantially the negative voltage of the power supply 24 during the OFF state of the circuit; however, the flow of current through transistor 11 when same is triggered to oscillate causes a discharging of this capacitor 29 inasmuch as the current through resistor 26 produces a potential difference thereacross. The capacitor 29 thus discharges to some relatively constant voltage state of a negative polarity during the oscillatory conduction of the transistor 11. Application of a further positive voltage pulse to the input terminal 16 serves to increase the amplitude of oscillations in the transistor 11 and tank circuit 19 by virtue of the establishment of a further bias current to the transistor emitter. This increased conduction serves to further reduce the charge upon the capacitor 29 to substantially zero. Consequently, at the termination of the second positive polarity input pulse at the input terminal 16, an insufficient voltage is applied across the transistor 11 to maintain conduction therethrough. As a consequence thereof, the transistor cuts off and ceases to conduct, so as to thereby revert to the original OFF state. It will be appreciated that the relative magnitudes of the applied voltage from the power supply 24 and the time constant of the resistor 26 and capacitor 29 are of importance in determining the operating characteristics of the above-described circuit. Thus, it is necessary for the active element, herein illustrated as a transistor 11, to be originally reverse-biased with no positive bias current to the emitter, so as to remain in a non-conducting state. It is further necessary for the transistor to be triggered by the application of a bias current and to be maintained in such conducting state by the application of a sufficient voltage thereacross. The time constant of the resistor 26 and capacitor 29 herein serves to provide the necessary memory function wherein the bistable circuit is capable of returning from one steady state to another. The type of oscillator circuit and feedback is not critical to the present invention, beyond providing a resonant oscillatory condition and a suitable feedback circuit for maintaining the active element operating after the removal of an input signal. It is further necessary that the second input signal shall cause the active element, herein the transistor, to conduct sufficiently to reduce the applied voltage below that required for transistor gain, so that upon removal of this signal an insufficient voltage is available to maintain the transistor conducting.

The above-described embodiment of the invention may be constructed with a relatively wide latitude of values of the component circuit elements, as long as the relationship therebetween is preserved. As an example, the circuit of FIG. 1 has been constructed using a 2N414 transistor with a minus eight volt direct current output of power supply 24 and the following circuit element values:

| | | |
|---|---|---|
| **14** resistor | ohms | 15,000 |
| **17** resistor | do | 2,000 |
| **21** inductor | microhenrys | 400 |
| **22** capacitor | micromicrofarads | 500 |
| **23** capacitor | do | 500 |
| **26** resistor | ohms | 10,000 |
| **29** capacitor | micromicrofarads | 1,800 |

Figure 2:
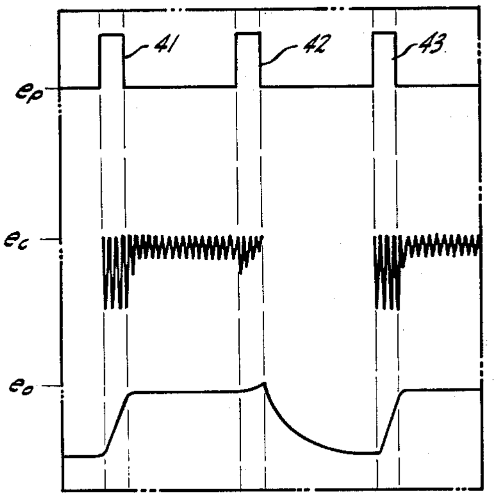
FIG. 2 is a series of curves illustrating voltages at various points in the circuit of FIG. 1 and their relation to each other.

As illustrated in FIG. 2, there is shown a series of positive polarity pulses 41, 42, and 43, generally denominated as $e_p$ and representing input signals to the input terminal 16 of the circuit of FIG. 1. As described above, the application of the input signal 41 causes the described bistable circuit to go into oscillation, as indicated by the waveform $e_c$. The magnitude of these oscillations is substantial during the application of the positive pulse 41 and will be seen to decrease in amplitude following cessation of this pulse but to continue until the second positive input pulse 42 is applied to the input terminal. The oscillatory signal $e_c$, as may be found at the collector of the transistor 11, increases in amplitude with the receipt of the second input pulse 42 by virtue of the increased current bias to the transistor emitter 13. As regards the voltage $e_0$ appearing at the output terminal 28, same is illustrated in FIG. 2, where it will be seen that such voltage $e_0$ has a relatively constant negative value prior to the receipt of the input pulse 41, and such value will approximate the negative voltage of the power supply 24. As soon as the transistor 11 is biased to conduction by the input pulse 41, the voltage $e_0$ at the output terminal 28 decreases in amplitude to a relatively low value and continues at this value until such time as the second input pulse 42 is applied to the circuit. The reduction in the amplitude of the voltage $e_0$ during application of the input pulse 41 and conduction of the transistor results from the voltage drop across resistor 26 and the consequent discharge of capacitor 29. This voltage $e_0$ then remains constant during such time as the circuit is oscillating in the ON stage and the capacitor 29 maintains a relative constant low voltage thereacross.

The second input pulse 42 increases the amplitude of oscillation in the transistor and tank circuit 19 so as to produce a greater current drain through the resistor 26 from the power supply 24 and to thereby consequently lower the charge upon the capacitor 29 to substantially zero. Since this capacitor voltage is substantially the voltage at the output termianl 28, $e_0$, such ouput voltage then approaches zero, as illustrated in FIG. 2. Upon termination of the second input pulse 42 the voltage $e_0$, applied across the transistor, is substantially zero, so that the transistor cannot continue to conduct in the absence of a bias current applied to the emitter 13 thereof. Consequently, oscillations cease, as illustrated in FIG. 2, and current drain through the resistor 26 reduces, so that the voltage $e_0$ increases in the manner illustrated. It will be apparent from the foregoing that the above-described circuit has two stable states of operation, and furthermore that such circuit transfers between the states upon the application of successive positive pulses to an input terminal thereof. The particular oscillator connections of the active element and tank circuit are, as noted above, not critical to the present invention, and a multitude of variations are possible therein. Certain of these variations employing conventional and well-known oscillator circuitry are illustrated in other figures of the drawing and described below.

Figure 3:
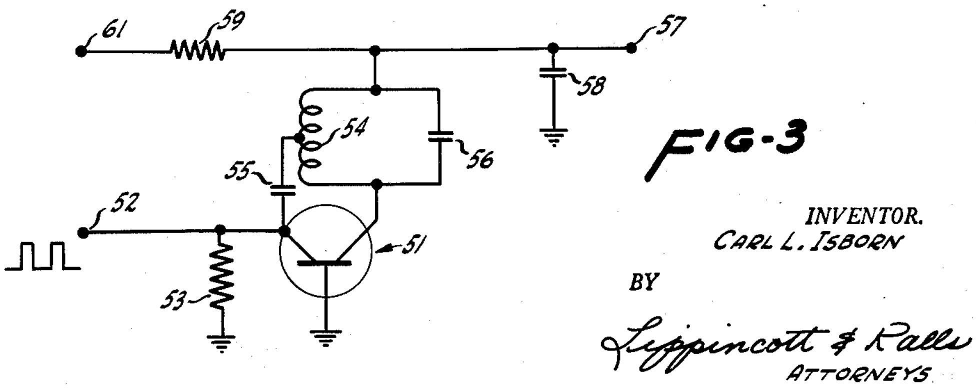
FIG. 3 is a circuit diagram of a bistable circuit in accordance with the present invention and embodying a Hartley oscillator circuit.

FIG. 3 of the drawing illustrates a bistable electronic circuit in accordance with the present invention employing a transistor 51 as the active element thereof and connections providing a Hartley oscillator circuit configuration. More particularly, the transistor 51 has the base thereof grounded and the emitter thereof connected to an input treminal 52 which is, in turn, grounded through a resistor 53. An inductor 54 and capacitor 56 are connected in parallel between the collector of the transistor 51 and an output terminal 57. The transistor emitter is connected through a blocking capacitor 55 to a tap on the inductor 54 to provide a feedback loop for the transistor. The output terminal 57 is grounded through a capacitor 58 and is connected through a resistor 59 to a negative power supply terminal 61. This circuit, in common with the one above-described, is adapted to receive positive pulses at the input terminal 52 for controlling the circuit to switch same between stable operating states thereof. Prior to the application of a positive pulse to the input terminal, the transistor 51 will be seen to have a reverse voltage applied across the collector junction thereof, so that substantially no conduction occurs in the absence of an emitter bias current. Upon the application of a bias current to the emitter of the transistor 51 by the application of a positive pulse to the terminal 52, the transistor 51 is rendered conductive. A feedback circuit is afforded through the resonant circuit comprising the inductor 54 and capacitor 56, so that oscillations result and are, in fact, sustained even after the removal of the input pulse. The transistor is maintained in an operating region of gain, so that oscillations continue substantially indefinitely with current being supplied from the power supply terminal 61 through the resistor 59 whereby the voltage at the output terminal, and thus across the capacitor 58, reduces in absolute magnitude.

This steady oscillatory state of the bistable circuit of FIG. 3 continues until a second positive polarity input pulse is applied to the input terminal 52 thereof. This input pulse does not in itself serve to cut off the transistor conduction, but to the contrary, and in common with the circuit of FIG. 1, the amplitude of oscillation supported by the circuit hereof is increased by the second input pulse so that a greater current is drawn from the power supply terminal 61 through the resistor 59, and consequently a further reduction is provided in the direct current voltage at the output terminal 57. Upon the cessation of this second input pulse there is found to be an insufficient voltage applied across the transistor 51 to support conduction thereof. In other words, $e_0$ is substantially zero, or is at least of a sufficiently low magnitude that the transistor 51 is no longer maintained in a region of gain, and consequently cannot continue to conduct even though the feedback circuit yet remains thereacross. Consequently, the transistor 51 ceases to conduct, and the bistable circuit returns to the original cut-off state thereof. Immediately following cessation of conduction by the transistor 51, the capacitor 58 is recharged by current flowing through the resistor 59, inasmuch as the oscillatory portion of the circuit no longer drains off this current. The direct current output voltage at the terminal 57 will thus be seen to increase in magnitude in a negative direction to a steady state which persists until a further input pulse is supplied to the circuit at the terminal 52.

It will be appreciated that output signals from the circuits of FIGS. 1 or 3 may be obtained from the output terminals therein indicated or, alternatively, may be obtained from other portions of the circuit thereof. Thus, a direct current voltage appears at the indicated output terminals, but an alternating current voltage may be obtained from such as the collector of the transistor thereof. The resistor and capacitor connected to the indicated output terminals of these circuits perform the added function of producing a filtered direct current output voltage thereat, and for particular applications it is very desirable to receive direct current output voltages of different magnitudes for the two stable operating states of the bistable circuit hereof. For other applications it is particularly desirable to have available an alternating current from such a circuit, and by appropriate connection to such as the collector of the transistor of this invention there will be seen to be available an oscillatory signal $e_c$ which may be operated upon in the manner of alternating current signals. In those instances wherein amplification of an output signal from the bistable circuit hereof is desired or required, this alternating current signal is highly desirable, inasmuch as same is much more readily amplified than the direct current output signal normally attainable from bistable circuits.

Figure 4:
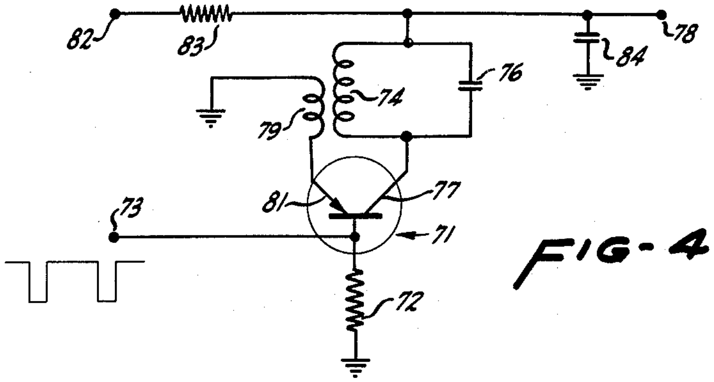
FIG. 4 is a circuit diagram of a bistable circuit in accordance with the present invention and embodying a "tickler feedback" circuit.

As noted above, the oscillator connections of the present invention may be varied within a relatively wide range, and there is illustrated in FIG. 4 an alternative circuit connection in accordance with the present invention. As therein illustrated, a transistor 71 has the base thereof grounded through a resistor 72 and an input terminal 73 directly connected to such base element. A resonant circuit including an inductor 74 and a capacitor 76, connected in parallel, is provided in connection between a collector 77 of the transistor and an output terminal 78. Feedback is herein afforded by the provision of a winding 79 disposed in inductive relation to the collector winding or inductor 74 and connected between the transistor emitter 81 and ground. In common with the above-described embodiments of the present invention, a negative power supply terminal 82 is connected through a resistor 83 to the output terminal 78 which is, in turn, grounded through a capacitor 84. This particular embodiment of the present invention is adapted to receive negative going pulses at the input terminal 73 thereof, inasmuch as such terminal is connected to the base element of the transistor 71. Prior to the receipt of input pulses at the terminal 73, the transistor 71 will be seen to be biased to cut-off by the application of a negative voltage to the collector 77. Inasmuch as no bias current is applied to the emitter 81 during such condition, the transistor 71 does not conduct, and the capacitor 84 is consequently charged to substantially the voltage of the negative power supply terminal 82; this voltage being reflected at the output terminal 78 as a direct current output signal from the circuit.

Application of a negative polarity pulse to the input terminal 73 will be seen to bias the transistor 71 to conduction. Current flows from the emitter 81 by virtue of this biasing, and consequently the transistor 71 conducts. A feedback circuit is supplied between the collector and emitter of the transistor 71 by virtue of the inductive coupling between the emitter winding 79 and the collector winding 74 in the resonant circuit connected to the collector 77. Oscillatory conduction thus results, and in fact continues even after the cessation of the negative input pulse. Again in this instance, the amplitude of oscillations reduces somewhat following removal of the negative input signal; however, the transistor exhibits a gain, so that the resonant feedback path is adequate to maintain oscillatory conduction of the transistor, even after removal of the negative input signal. The large amplitude oscillations supported by the circuit during application of the negative input pulse serve to partially discharge the capacitor 84, and the continued current drain through the transistor 71 in the oscillatory ON state of the circuit causes a sufficient current drain through the resistor 83 to prevent recharging of this capacitor 84, so that the direct current output voltage at the terminal 78 has a substantially smaller magnitude during the oscillatory state of the circuit than otherwise.

Application of a second, negative input signal to the terminal 73 causes the amplitude of oscillations to increase, so as to thereby draw a greater current through the resistor 83 and to consequently thereby further discharge the capacitor 84 and decrease $e_0$ at terminal 78 to substantially zero. Termination of this second negative going input pulse at the terminal 73 finds the transistor having an insufficient voltage applied thereacross to continue conduction, and consequently the transistor ceases to conduct. The circuit has then reverted back to the original OFF state, and the capacitor 84 recharges through the resistor 83 from the negative power supply terminal 82, so that the direct current output signal at the terminal 78 increases in magnitude to the original value thereof. An oscillatory signal is available from various portions of the above-described circuit of FIG. 4 during the oscillatory state of such circuit, and likewise, a direct current signal is available from the terminal 78.

It is to be noted that the active element or amplifier of the bistable circuit, herein illustrated as a transistor, is driven into a region of relatively high gain by the application of input signals thereto, so that conduction will continue until a further input signal affects the associated circuit to remove the active element from such region. The transistors illustrated in the above-described embodiments of the present invention are considered to be P-N-P type transistors, as indicated by the symbols employed in the illustration, and the transistors may be connected in any desired orientation to provide a gain or amplification. The circuit of FIG. 1, for example, will thus be seen to provide a reverse voltage across the collector junction of the transistor thereof in the non-oscillatory state of the circuit, inasmuch as the collector is maintained at a negative potential with respect to the grounded base. In the absence of an emitter current, the collector provides a very high resistance connection to the tank circuit 19, and furthermore, the initial surge of current to the emitter, caused by the charging of capacitor 22 at the time the power supply 24 is connected to the circuit, is of such a polarity as to further increase the resistance of the collector circuit. As described above, the application of a positive pulse to the emitter forces the transistor into an active region where it exhibits a gain, so that the circuit immediately begins to oscillate. It will be appreciated that the utilization of transistors of the N-P-N type call for a reversal of polarity in the applied voltages. It is further to be noted that the transistors herein illustrated are junction-type transistors, which have been found to be much better suited for this type of application than point contact transistors. While it is possible to employ various types of transistors as the active element in the bistable circuit of the present invention, material advantage lies in the utilization of junction-type transistors and, in distinction to certain prior art devices, the circuit hereof is particularly suited to the utilization of junction-type transistors.

Figure 5:
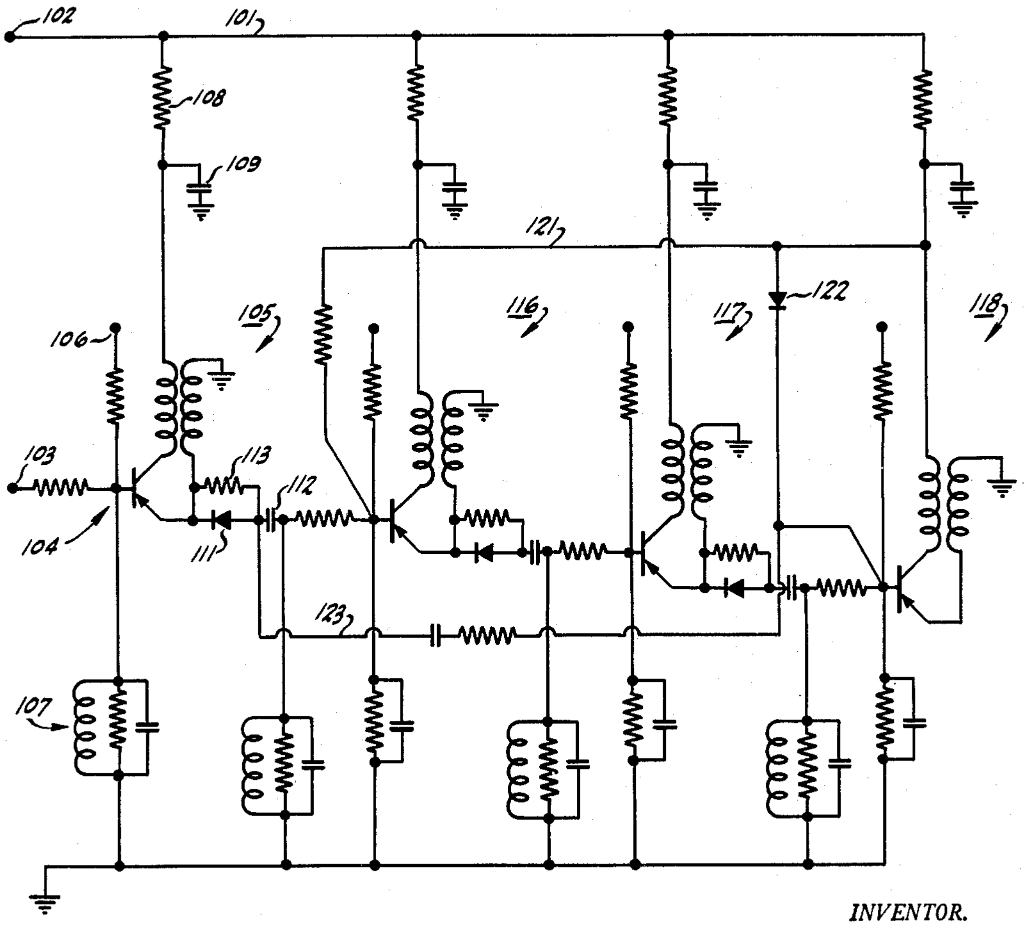
FIG. 5 is a circuit diagram of a portion of a decade counter employing the bistable circuit of the present invention.

The flip-flop or binary circuit described above with relation to various embodiments of the present invention may be employed in particular combinations or forms, such as counter circuits. An improved decade counter circuit utilizing the bistable electronic circuit of the present invention is illustrated in FIG. 5, and referring thereto, there will be seen to be provided a power supply bus 101 connected to a negative power supply terminal 102 for supplying operating voltages to the various stages of the illustrated circuit. Input signals are applied, in the form of pulses of negative polarity, to an input terminal 103, which is resistively coupled to the base of a first transistor 104. This first transistor 104 and associated circuit elements herein comprise a first stage 105 of the counter circuit, and feedback is therein provided by inductive coupling between coils connected in the emitter and collector circuits of the transistor. A biasing potential is provided from a positive power supply terminal 106, resistively coupled to the base of the transistor, and an LC ringing circuit 107 is likewise connected to the base of the transistor in order to provide a positive polarity tail to the input pulse. The first stage is connected to the power supply bus 101 through a resistor 108, which is grounded through a capicitor 109, so as to thereby provide the memory function for the circuit. This first stage circuit is also coupled through a unidirectional device, such as a crystal diode 111 and capacitor 112 to a second stage of the counter. A resistor 113 bypasses the diode 111 to provide a suitable D.-C. return for the anode of diode 11. As herein illustrated, the counter includes four stages, 105, 116, 117, and 118, cascaded together and coupled as above-noted to the input terminal 103. These four stages serve as binary circuits to produce results analogous to those of other decade counters known in the art.

In order to limit the number of circuit conditions to ten, as is required for a decade counter, there is herein provided certain feedback loops designed to eliminate certain stable states of the overall circuit. Thus, connected is made by a conductor 121 from the collector circuit. Thus, connection is made by a conductor 121 from the collector circuit of the last stage 118 to the input or base circuit of the second stage 116 through a suitable resistive coupling. Connection is also made from this conductor 121 to the input of the last stage 118 through a diode 122, and from the input of the second stage 116 via a conductor 123 coupling is afforded through a capacitor and resistor to the input of the last stage 118. It will be appreciated that decade counters and, in fact, counters in general, require the circuitry thereof to enter a unique operating state upon the receipt of a single input signal and to then transfer to a second operating state upon the receipt of a second input signal, etc. It is necessary that the counter circuitry not successively pass through each of the operating states thereof upon the receipt of a single input signal. Manners and means for attaining this result are generally known in the art, and it will be appreciated that the circuit of FIG. 5 employs suitable feedback loops and bypass circuitry to insure this condition. The feedback loop provided through the conductor 121 serves to remove one of the stable operating states of the second stage of the counter, and likewise, the feedback loop provided through the diode 122 serves to remove another stable operating state of the counter.

Registry may be obtained from the counting circuit illustrated by connection to suitable points in the layout thereof, as is well-known in the art, and in accordance with the present invention it is possible to obtain either a direct current output signal or an alternating current output signal from the oscillations in the binary circuits of the counter. The availability of an alternating or an oscillating current output signal from various portions of the counter circuit is highly desirable, inasmuch as such alternating current signals may be more readily amplified than direct current signals normally available from counters of this general nature. In those instances wherein there are employed registration means which require a substantial voltage for operation thereof, the alternating current signal available herefrom is much more readily amplified, so as to be suitable to operate such indicating means. It will be appreciated that the individual stages 105, 116, 117, and 118 of the counter illustrated in FIG. 5 are substantially the same as those described above in connection with various embodiments of the bistable electronic circuit of the present invention. Obviously, various minor modifications of the individual circuits are desirable for particular applications, and certain modifications are included in the illustrated counting circuit.

Figure 6:
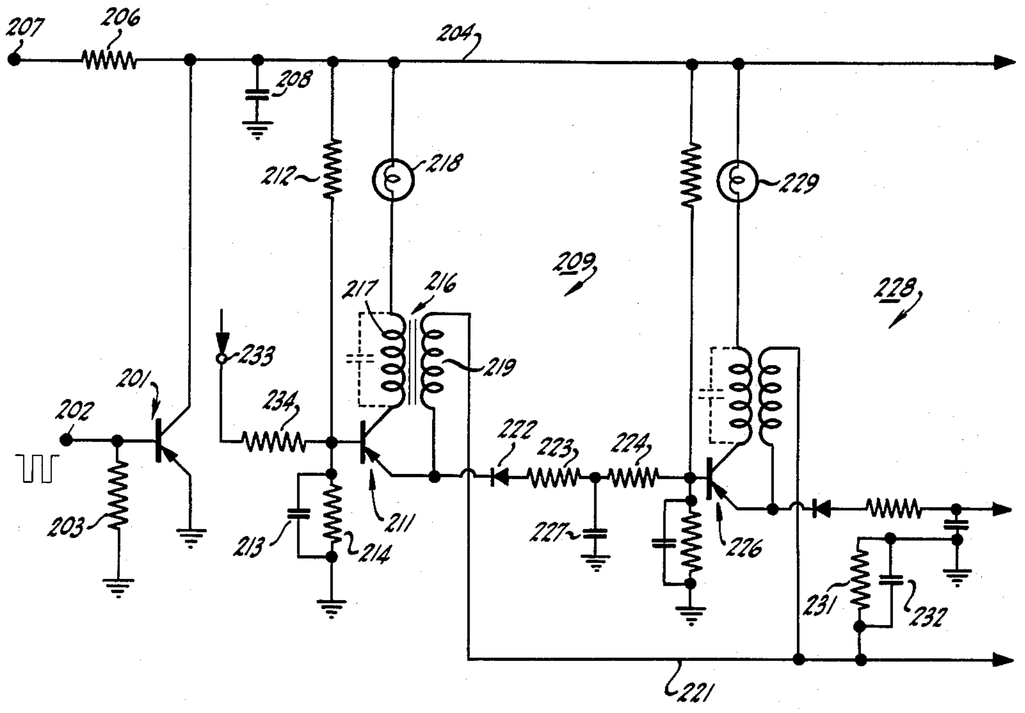
FIG. 6 is a circuit diagram of a portion of a ring counter in accordance with the present invention.

In addition to the decade counter described above, the improved binary circuit of the present invention may also be combined to form an improved ring counter, this general type of counter being well-known in the art. There is illustrated in FIG. 6 of the drawings a portion of the ring counter employing the flip-flop circuit of the present invention. In the interest of simplicity, the ring counter of FIG. 6 is illustrated only as to the initial stages thereof, as the remaining stages are substantially identical thereto. Referring to FIG. 6, there will be seen to be provided a trigger transistor 201 having the base thereof connected to an input terminal 202 and grounded through a resistor 203. The emitter of the transistor 201 is directly grounded and the collector of this transistor is directly connected to a negative power supply bus 204, which is in turn connected through a resistor 206 to a direct-current power supply terminal 207. A capacitor 208 is connected between the power supply bus 204 and ground to provide filtering of the supply bus voltage. A first stage 209 of the ring counter illustrated in FIG. 6 includes a transistor 211 having the base thereof connected through a resistor 212 to the negative power supply bus 204 and grounded through an integrating circuit including parallel connected capacitor 213 and resistor 214. A transformer 216 is provided with a primary winding 217, which connects the collector of the first stage transistor 211 to the power supply bus 204 through an indicating lamp 218. A secondary winding 219 of the transformer 216 connects the first stage transistor emitter to a bias bus 221. Coupling between stages of the counter is provided by a diode 222 connected to the emitter of the first stage transistor 211 and oriented to conduct current in a direction toward this emitter. A pair of resistors 223 and 224 are connected from the diode 222 to the base of a second stage transistor 226. A capacitor 227 is connected between ground and the junction of the resistors 223 and 224.

The second stage 228 of the ring counter including the transistor 226, noted above, is substantially identical to the above-described first stage 209. An indicating lamp 229 is connected between the second stage transistor 226 and the power supply bus 204 to indicate conduction of the second stage of the counter. There is further provided a connection from the bias bus 221 to ground through an integrating circuit including the parallel combination of a resistor 231 and a capacitor 232. Further stages of the ring counter are not herein illustrated nor described inasmuch as same are substantially identical to the initial stages of the counter, and there is provided a return connection from the last stage to a terminal 233, which is coupled through a resistor 234 to the input or base connection of the transistor 211 of the first stage of the counter. This connection is provided in order that the counter shall continue counting beyond the number of stages thereof.

Although a relatively wide variety of values of the individual circuit elements of the ring counter described above may be chosen at the desire of the circuit designer, all in accordance with the present invention, there is set forth below a table of values for elements of a ring counter which has been found to be operable in accordance with the present invention. A ring counter constructed in accordance with this example employs transsistors of the 2N414 type, diodes of the 1N95 type, indicating lamps identified as 6C, and employs a power supply voltage upon the bus 204 of about minus nine volts as supplied to the input terminal 207, with negative input pulses at the input terminal 202. The following listing is exemplary of the values of circuit elements that may be employed in the embodiment of the present invention illustrated in FIG. 6:

| | | |
|---|---|---|
| **203** resistor | kilohm | 22 |
| **206** resistor | ohm | 100 |
| **208** capacitor | microfarad | 0.1 |
| **212** resistor | kilohm | 22 |
| **213** capacitor | micromicrofarad | 500 |
| **214** resistor | ohm | 270 |
| **223** resistor | do | 1000 |
| **224** resistor | do | 1000 |
| **227** capacitor | microfarad | .05 |
| **231** resistor | ohm | 27 |
| **232** capacitor | microfarad | 0.1 |
| **234** resistor | ohm | 1000 |

Energization of the negative bus 204 by the application of a negative potential to the power supply terminal 207 initially applies a potential across the transistors of the separate stages of the ring counter, and as no bias is initially applied to the bias bus 221, the transistor bases are thus driven to a negative potential with respect to the collectors thereof. As the negative potential of the bus 204 increases, one of the counter stages will commence to conduct and immediately draw current through the emitter thereof to place a bias voltage upon the bias bus 221. This bias voltage upon the bias bus 221 then serves to bias the remaining stages of the counter to cut-off, so that only a single stage may conduct at a time. With a single stage of the counter conducting, there will be produced an oscillation in the collector circuit thereof, which will, in turn, cause a substantial current to flow through the indicating lamp connected in series with the collector. This lamp then lights to indicate that such stage is conducting. With the first stage or element of the counter conducting, the voltage of the bus 221 increases by virtue of the current drawn through a resistor 231, connected from the bus to ground, and consequently, the remaining transistors of the separate stages are prevented from conducting. The value of the individual base resistors, as exemplified by the resistor 212 of the first stage of the counter, is so chosen that each of the stages could and would conduct if the bias voltage of the bus 221 were removed. Resistor 206 prevents trigger transistor 201 from shorting out the supply connected to the terminal 207. In this manner, only a single stage of the counter can operate at one time.

The conduction of the first stage produces a negative output which is applied through the rectifying diode 222 to the second stage 228. A delay circuit is provided by a resistor 224 inserted in series between the first and second stages of the counter and capacitor 227 connected from the input end of this resistor to ground. Thus, the output of the first stage delays the receipt of the first stage current to the base of the second stage, and the output of the first stage may then be likened to a "priming" current, which serves to place the second stage in condition for conduction during a period in which no stages of the counter conduct. The application of a further negative voltage pulse to the input terminal 202 will actuate the trigger transistor 201 to thereby reduce the magnitude of voltage on the bus 204, whereby the first stage transistor 211 is cut off. In like manner, insufficient voltage is available from the bus 204 to establish conduction in any other stage of the ring counter. Upon cessation of the input signal to the transistor 201, the voltage of the bus 204 rises to the point where the second stage of the counter conducts. Conduction of the second stage occurs because of the priming current which flows to the base of the transistor 226 thereof in a delayed fashion from a first stage. This delay provides for placing only the second stage transistor in condition to conduct at a low voltage level of the bus 204. As soon as the second stage transistor 226 conducts, there appears a voltage upon the bias bus 221 to thereby prevent any other stage of the ring counter from conducting, even though the voltage of the bus 204 should rise to the total voltage value of the power supply terminal 207.

It will thus be appreciated that but a single stage of the ring counter can conduct at any particular time, and furthermore, that the conduction of each stage passes a priming current to the next successive stage. The delay provided between successive stages provides for the presence of a priming current at the base of the transistor of the next succeeding stage, so that this stage is the first to conduct upon the rising voltage being applied to the power supply bus 204. Inasmuch as conduction of a single stage provides a voltage upon the bias bus 221 to maintain the other stages non-conducting, it thus follows that the counter operates in succession from one stage to the other to thereby light the associated lamp or indicating device connected to each stage in succession as an indication of the successive pulses received by the circuit. In order that the ring counter may continue to operate beyond some predetermined number of stages thereof as, for example, ten, connection is made from the last stage to the input of the first stage at terminal 233 resistively coupled to the base of the transistor 211. Various modifications of the illustrated circuit may be employed to produce particular desired results, and thus, for example, additional damping may be inserted in the circuit for particular applications.

The above-described embodiments of the bistable electronic circuit and counter circuits of the present invention clearly establish that the invention hereof fully accomplishes the objects set forth above. There are hereby provided a materially improved bistable circuit which is highly suited for use as a flip-flop circuit or binary and in addition improved counting circuits utilizing these basic circuits.

What is claimed is:

1. A counter circuit comprising a plurality of bistable stages oscillatory and non-oscillatory stable states, each of said stages including an amplifier having a current-emissive electrode, a current-receiving electrode and a control electrode for current passing between said current-emissive and current-receiving electrodes; each of said amplifiers having a resonant feedback connection between its current-receiving and current-emissive electrodes so that said stages exhibit a sustained oscillation when conductive; power supply means connected to each of the current-receiving electrodes and having a selectively variable output potential whereupon all of said amplifiers are enabled to conduct or all of said amplifiers are cut-off; means connecting each of the current-emissive electrodes to a bias bus for biasing said amplifiers to cut-off upon conduction of any one amplifier; and a plurality of means each including a capacitor for connecting the current-emissive electrode of each stage to the control electrode of the immediately succeeding stage, said capacitor being charged when current flows through said current-emissive electrode upon conduction of the amplifier associated therewith, said charge flowing into the control electrode of the immediately succeeding stage upon removal of the cut-off potential at the output of said power supply means so that only said immediately succeeding stage becomes conductive.

2. The counter circuit described in claim 1 wherein each of said means for connecting the current-emissive electrode of each stage to the control electrode of the immediately succeeding stage includes a diode for supplying a unidirectional charging current to said capacitor.

3. A counter circuit comprising a plurality of bistable stages having oscillatory and non-oscillatory stable states, each of said stages including an amplifier with resonant feedback connections so that said stages exhibit a sustained oscillation when conductive; power supply means connected to each of said amplifiers and having a selectively variable output potential whereupon all of said amplifiers are enabled to conduct or all of said amplifiers are cut-off; means connected with each of said amplifiers for biasing same to cut-off upon conduction of any one amplifier; and a plurality of means each including a capacitor for connecting respectively adjacent amplifiers, said capacitor being charged when the preceding amplifier conducts, said charge flowing into the immediately succeeding stage upon removal of the cut-off power supply potential so that only said immediately succeeding stage becomes conductive.

4. An improved counter circuit comprising a plurality of bistable circuits, each of said circuits including an amplifier with resonant feedback connections and integrating biasing means whereby successive input signals of like polarity switch a respective one of said bistable circuits between bistable states of a conducting state of sustained oscillation and a non-conducting, non-oscillatory state, a trigger circuit connected to an input terminal and to a power supply bus coupled to said bistable circuits whereby input signals actuate said trigger circuit to lower the potential of said power supply bus, a bias bus connected to each of said bistable circuits for biasing same to cut-off upon conduction of any one circuit, said bistable circuits being connected in succession by time-delay circuits whereby a conducting stage supplies a starting current to the next successive stage that is effective upon receipt of a successive input signal to cause the next successive bistable circuit to conduct, whereby respective individual circuits conduct in accordance with the number of input signals received.

5. A counter circuit comprising a plurality of bistable stages having oscillatory and non-oscillatory stable states, each of said stages including a single amplifier with feedback connections so that said stages exhibit a sustained oscillation when conductive, first means connected to each of said stages and supplying a variable potential for biasing said amplifiers whereupon all of said amplifiers are enabled to conduct, all of said amplifiers are cut-off, or all of the remaining amplifiers are cut-off upon conduction of any one amplifier, and interconnecting means for connecting respectively adjacent stages, each of said interconnecting means including a time delay circuit whereby a conducting amplifier supplies a starting current to the amplifier in the immediately succeeding stage so that the latter amplifier is enabled to become conductive before the remaining amplifiers when a predetermined potential is supplied by said first means.

6. A ring circuit comprising a plurality of bistable stages having oscillatory and non-oscillatory stable states, each of said stages including an amplifier with feedback connections so that said stages exhibit a sustained oscillation when conductive, power supply means connected to each of said amplifiers and having a controllable output potential to enable said amplifiers to conduct or to cut-off all of said amplifiers, means interconnecting said amplifiers including impedance means respectively connected between the amplifiers, said impedance means serving to conduct current when a preceding amplifier is conductive and to prime the immediately succeeding amplifier so that when said preceding amplifier is caused to become non-conductive by a change in the potential from said power supply means, said immediately succeeding amplifier will subsequently become conductive before the remaining amplifiers when the output of said power supply means again enables said amplifiers.

7. A counter circuit comprising a plurality of bistable stages having oscillatory and non-oscillatory stable states, each of said stages including an amplifier having first, second and third electrodes, each of said amplifiers having a feedback connection between its first and second electrodes so that said stages exhibit a sustained oscillation when conductive, power supply means connected to each of the first electrodes and having a selectively variable output potential whereupon all of said amplifiers are enabled to conduct or all of said amplifiers are cut-off, means connected to each of said second electrodes for biasing said amplifiers to cut-off upon conduction of any one amplifier, and a plurality of means each including a capacitor for connecting the second electrode of each stage to the third electrode of the immediately succeeding stage, said capacitor being charged when current flows through the immediately preceding amplifier when it conducts, said capacitor serving to bias the control electrode of the immediately succeeding stage when said preceding amplifier becomes non-conductive and the output potential of said power supply means supplies an enabling potential to said amplifiers so that only said immediately succeeding stage becomes conductive.

8. An improved circuit comprising a plurality of bistable circuits, each of said bistable circuits including a single amplifier and a resonant circuit connected between the output and input of said amplifier, each of said bistable circuits including biasing means therefor, a unilaterally conductive device and a delay circuit coupled between each of said bistable circuits, a power supply connected to each of said bistable circuits, and input trigger circuit means responsive to input pulses and connected to vary the output of said power supply for switching said bistable circuits between states which are stable after termination of input pulses, said stable states being a conducting state of sustained oscillation and a non-conductive, non-oscillatory state, whereby a bistable circuit in a first state supplies a starting signal to the next succeeding bistable circuit, the starting signal being effective upon receipt of a successive input signal to said input trigger circuit means to cause said next succeeding bistable circuit to assume said first state, thereby causing respective individual bistable circuits to assume said first state in accordance with the number of input signals received.

References Cited by the Examiner

UNITED STATES PATENTS

| | | | |
|---|---|---|---|
| 2,533,001 | 12/1950 | Eberhard | 307—88.5 |
| 2,595,208 | 4/1952 | Bangert | 307—88.5 |
| 2,700,102 | 1/1955 | Woodward | 328—40 |
| 2,741,701 | 4/1956 | Harris | 331—171 |
| 2,762,921 | 9/1956 | Henle | 331—112 |
| 2,763,780 | 9/1956 | Skelton et al. | 307—88.5 |
| 2,774,868 | 12/1956 | Havens | 328—42 |
| 2,802,052 | 8/1957 | Brewster | 307—88.5 |
| 2,826,695 | 3/1958 | Gray | 331—111 |
| 2,836,724 | 5/1958 | Kaminow | 331—117 |
| 2,873,388 | 2/1959 | Trumbo | 307—88.5 |
| 2,912,655 | 11/1959 | Wolfendale | 331—117 |
| 2,928,052 | 3/1960 | Wood | 331—117 |
| 2,993,173 | 7/1961 | Fischman | 328—40 |

FOREIGN PATENTS

| | | |
|---|---|---|
| 1,206,395 | 8/1959 | France. |

JOHN W. HUCKERT, *Primary Examiner.*

GEORGE N. WESTBY, *Examiner.*